United States Patent
Magata (10) Patent No.: US 8,014,042 B2
(45) Date of Patent: Sep. 6, 2011

(54) IMAGE READING APPARATUS (75) Inventor: Shoko Magata, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1009 days.

(21) Appl. No.: 11/860,380

(22) Filed: Sep. 24, 2007

(65) Prior Publication Data

US 2008/0074714 A1   Mar. 27, 2008

(30) Foreign Application Priority Data

Sep. 26, 2006   (JP) ................. 2006-261247

(51) Int. Cl.
*H04N 1/04*   (2006.01)
(52) U.S. Cl. ......... 358/474; 358/496; 358/497; 358/498
(58) Field of Classification Search .................. 358/474, 358/496, 497, 498; 399/380
See application file for complete search history.

(56) References Cited

U.S. PATENT DOCUMENTS 7,512,376 B2 *  3/2009  Suzuki ...................... 399/380

FOREIGN PATENT DOCUMENTS

| JP | 61-256341 | | 11/1986 |
| JP | 2001-007960 | * | 12/2001 |
| JP | 2005-215265 | * | 8/2005 |
| JP | 2006-145708 A | | 6/2006 |

* cited by examiner

*Primary Examiner* — Houshang Safaipour
(74) *Attorney, Agent, or Firm* — Canon USA Inc IP Division (57) ABSTRACT An image reading apparatus including an image reading portion reading an image of an original placed on an original stand; an original cover pressing the original on the original stand; a plurality of hinge portions pivotally supporting the original cover with respect to the image reading portion; a plurality of opening and closing drive portions arranged in the plurality of hinge portions, respectively to open-drive and close-drive the original cover; and a control portion open-driving and close-driving the plurality of opening and closing drive portions based on different drive profiles, respectively.

8 Claims, 5 Drawing Sheets

IMAGE READING APPARATUS

BACKGROUND OF THE INVENTION

1. Field of the Invention

The present invention relates to an image reading apparatus, and more particularly, to the one for opening and closing an original cover by a drive device.

2. Description of the Related Art

In general, an image reading apparatus mounted on an image forming apparatus such as a copy machine or a facsimile machine includes an original cover openable and closable with respect to an original stand on which an original is placed to be read.

When the image reading apparatus reads the original as a sheet, the original cover carries out a function to press the original placed on the original stand from above to prevent the original from being displaced, or a function to reflect a light from an exposure mechanism provided inside the apparatus main body so as to allow reading an excellent image.

In such an image reading apparatus, after the original cover is manually opened and an original is placed on the original stand, reading is performed in a state in which the original cover is closed, and after completion of reading, the original cover is manually opened again and the original is removed from the original stand.

Furthermore, in addition to the original cover arranged to be opened and closed manually as described above, there is an image reading apparatus having an original cover including an automatic original feeder conveying an original onto the original stand. However, the original cover including such an automatic original feeder requires a relatively large force for opening and closing the original cover because it is heavier as compared with an original cover without an automatic original feeder.

On the other hand, as with an invention described in Japanese Patent Application Laid-Open No. S61-256341, there is proposed an image reading apparatus in which an opening and closing drive portion, such as a motor for opening and closing the original cover with respect to the original stand, is provided in a hinge portion. This saves the trouble of opening and closing the original cover manually at the start of a copying operation and at the end of the copying operation, and prevents the original cover from being left unclosed and the original from being left.

When the original cover equipped with the opening and closing drive portion as described in Japanese Patent Application Laid-Open No. S61-256341 includes the automatic original feeder as mentioned above, the opening and closing drive portion must perform opening and closing drives in a state of supporting an entire load including the automatic original feeder. When the original cover having such a weight, for example, is driven so as to be opened and closed by one motor, heat or noise is likely to be generated because a load applied to the motor increases excessively. Accordingly, a problem arises that in order to obtain a torque suitable for opening and closing the original cover having the above-mentioned weight, a high-output motor with relatively large outer shape is required.

To solve the problem as above, it is conceivable that the motor as the opening and closing drive portion of the original cover is arranged at each of a plurality of locations of the original cover rather than one location.

For example, there is an original cover pivotally supported by the hinge portions at two locations, and in the case of the original cover like this, a motor for opening and closing the original cover is arranged at each hinge portion. However, in the case of an original cover including the automatic original feeder, each motor is not equal in rotary movement because a load applied to each motor is not uniform since a load distribution of the automatic original feeder is not uniform with respect to a profile of the original cover.

That is, when these two motors are equal in torque setting, although a motor arranged at a region side of the original cover relatively light in weight is likely to rotate faster than a motor arranged at a region side relatively heavy in weight, the former motor is restrained by the movement of the latter motor. When the movements restraining each other are repeated, the original cover becomes unstable in opening and closing actions, for example, the opening and closing actions are damaged in high quality feeling by accepting the opening and closing actions with yawing.

Furthermore, when the unstable opening and closing actions mentioned above are repeated, the original cover is twisted, and a component of the automatic original feeder may cause displacement or damage, generating a possibility to be influenced in a conveying performance of the original or a geometrical characteristic of the read image.

SUMMARY OF THE INVENTION

The present invention is directed to an image reading apparatus capable of stably open-driving and close-driving an original cover by a plurality of opening and closing drive portions.

In accordance with an aspect of the present invention, there is provided an image reading apparatus includes an image reading portion reading an image of an original placed on an original stand; an original cover pressing the original on the original stand; a plurality of hinge portions pivotally supporting the original cover with respect to the image reading portion; a plurality of opening and closing drive portions disposed in the plurality of hinge portions, respectively, and open-driving and close-driving the original cover; and a control portion open-driving and close-driving the plurality of opening and closing drive portions by respective different drive profiles.

The above features and advantages of the invention will become more apparent from the following detailed description taken in conjunction with the accompanying drawings.

DESCRIPTION OF THE EMBODIMENTS

Figure 1:
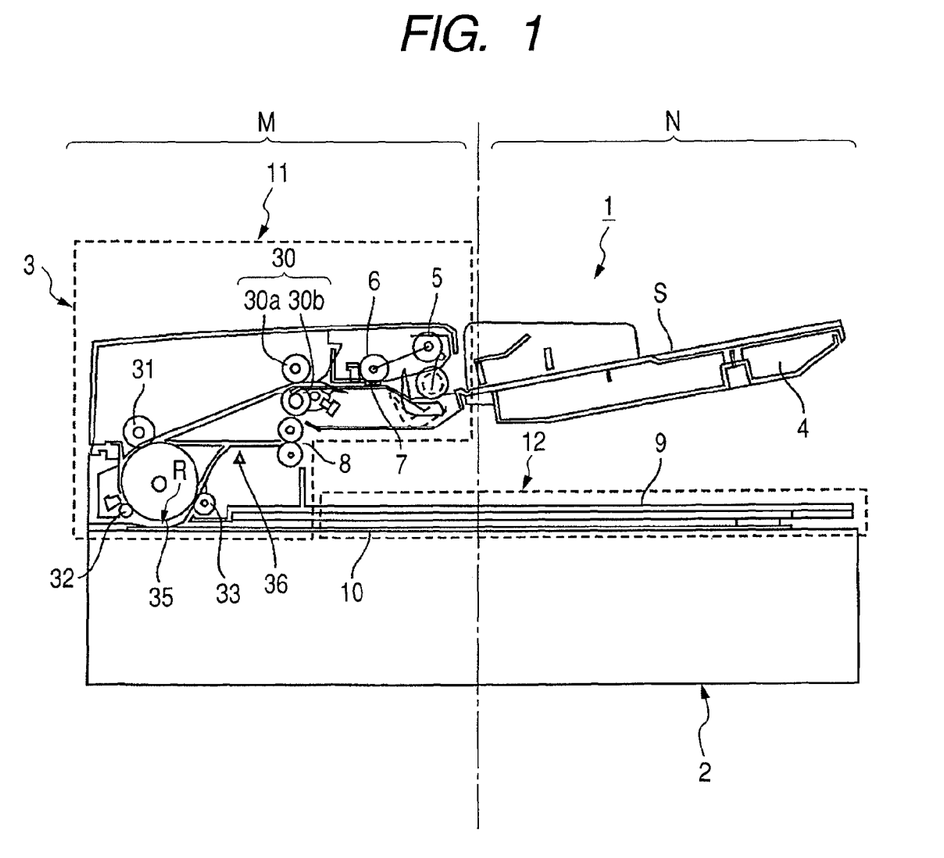
FIG. 1 is a diagram illustrating a construction of an image reading apparatus.

Hereinafter, an exemplary embodiment for carrying out the present invention will be described in detail referring to the drawings. FIG. 1 is a diagram illustrating a construction of an image reading apparatus 1 relating to the present embodiment.

As shown in FIG. 1, the image reading apparatus 1 includes an image reading portion 2 and an original cover 3.

The image reading portion 2 optically reads an image of an original S as a sheet, and receives the image as image data by photoelectrically converting reflected light from the original S into an electrical signal. Specifically, the image reading portion 2 irradiates a light from a light source (not illustrated) to the original S as an object to be read, guides the reflected light at that time through a scan mirror (not illustrated) and a lens unit, and receives the image as the image data photoelectric-converted by a CCD sensor.

The original cover 3 includes a sheet feeding tray 4 as an original placing stand provided in an upper portion of the original cover 3, a conveying portion 11 conveying the original placed on the sheet feeding tray 4, and an original pressing portion 12 on which a discharge tray 9 receiving the original discharged from the conveying portion 11.

The originals S placed on the sheet feeding tray 4 in the original cover 3 are fed in order from an original located uppermost by a feeding roller 5 provided in the conveying portion 11. The original S fed by this feeding roller 5 is separated one by one by a separation conveying roller 6 and a separation pad 7 which are vertically arranged.

The original S separated and conveyed is hit at its leading edge against a nip of a first pair of registration rollers 30 (a registration roller 30a and a registration driven roller 30b) stopped their rotation, thus forming a loop in the original S by a rotation of the separation conveying roller 6. Here, when the original S is skewed, the first pair of registration rollers 30 corrects the skew feed of the original S.

When the original S is a single-sided original having an image on one side (front side) thereof, the first pair of registration rollers 30 collects the skew feed of the original S. And thereafter the original S is conveyed through a second registration roller 31, a first conveying roller 32, and a second conveying roller 33 to a reading position R on a conveying guide 35. Then, the image on the front side of the original S is read while the original S is conveyed through the reading position R. Thereafter, the original S is conveyed by the second conveying roller 33, and discharged onto the discharge tray 9 by sheet discharge rollers 8 with the front side of the original S facing downward.

Furthermore, when the original S is a double-sided original having images on both sides (front side and back side) thereof, the skew feed of the original S is corrected. Thereafter, the original S is conveyed to the reading position R on the conveying guide 35 by the second registration roller 31, the first conveying roller 32, and the second conveying roller 33. Then, the image of the front side of the original S is read while the original S is conveyed through the reading position R. Thereafter, the original S is conveyed by the second conveying roller 33 and is further conveyed by the sheet discharge rollers 8 toward the discharge tray 9. Furthermore, when a sheet discharge sensor 36 detects the trailing edge of the original S and is turned off, the conveyance of the original S is stopped in a sate in which the trailing edge side portion of the original S is nipped by the sheet discharge rollers 8.

The original S is switch-back-conveyed after its conveyance is stopped, and the second registration roller 31 corrects the skew feed of the original S, again. Then, the original S is conveyed by the second registration roller 31, the first conveying roller 32, and the second conveying roller 33, and the image of the back side of the original S is read while the original S is conveyed again through the reading position R.

Here, if the original S is discharged onto the discharge tray 9 by the sheet discharge rollers 8 from the above-mentioned state, the front side thereof faces upward. Therefore, after the image of the back side of the original S is read, the second conveying roller 33 and the sheet discharge rollers 8 convey the original S toward the discharge tray 9, again.

Then, when the sheet discharge sensor 36 detects the trailing edge of the original S and is turned off, the conveyance of the original S is stopped in a state in which the trailing edge side portion of the original S is nipped by the sheet discharge rollers 8. Thereafter, the original S is switch-back-conveyed, and the second registration roller 31, the first conveying roller 32, and the second conveying roller 33 convey the original S. Then, the original S is discharged by the sheet discharge rollers 8 onto the discharge tray 9 with the front side thereof facing downward. However, when discharging the original S, the image of the original S is not read even while the original S is being conveyed through the reading position R.

In addition, an original such as a book-original which cannot be conveyed by the conveying portion 11 is placed directly on an original stand 10 made of transparent glass, and the original cover 3 is closed (into a state in which the original cover 3 is pivoted downward in a direction indicated by the arrow C2 in FIG. 2, as described later). The image reading portion 2 reads the image in a state that the original is pressed by the original pressing portion 12.

On the other hand, the original cover 3 includes the conveying portion 11 at the left side portion (a region M shown in FIG. 1) as viewed from the front, and includes the sheet feeding tray 4 and the discharge tray 9 at the right side portion (a region N shown in FIG. 1). Accordingly, the original cover 3 in the present embodiment is heavier in the region M side than in the region N side, and weighs the same as an original cover of an image reading apparatus including a conventional conveying portion. The entire original cover 3 has an uneven weight distribution.

Subsequently, a construction relating to the opening and closing drive of the original cover 3 is described in detail referring to FIG. 2 and FIG. 3. FIG. 2 is a perspective diagram illustrating the image reading apparatus 1 viewed obliquely from behind.

Figure 2:
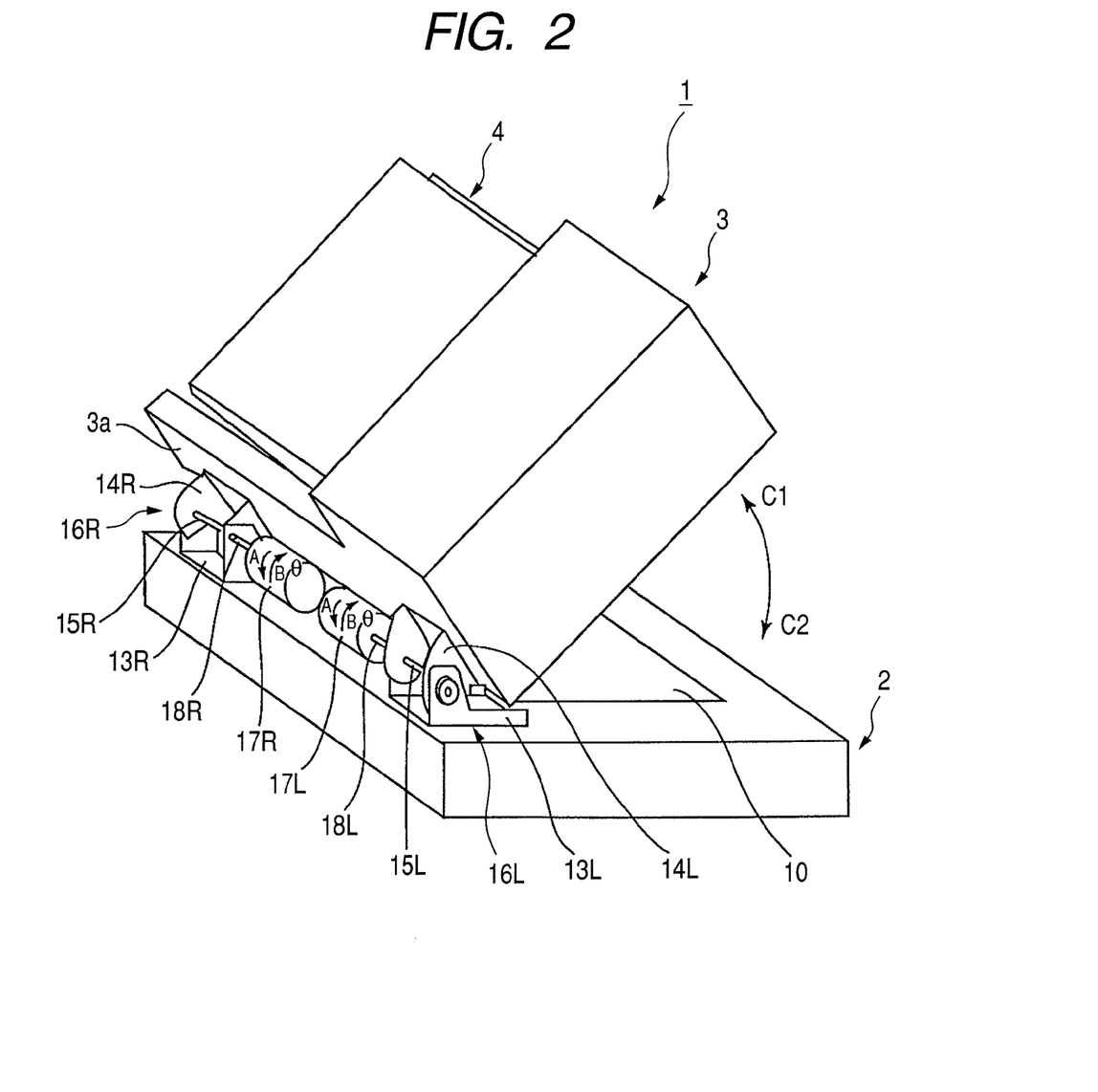
FIG. 2 is a perspective diagram illustrating the image reading apparatus viewed obliquely from behind.

As shown in FIG. 2, hinge bases 13R, 13L for pivotally supporting the original cover 3 together with this image reading portion 2 are arranged in a back side (a back side of the drawing plane of FIG. 1) of an upper surface of the image reading portion 2. In a rear side 3a of the original cover 3, hinge movable bodies 14R, 14L are fixed, and are connected with the hinge bases 13R, 13L through pins 15R, 15L to construct hinges 16R, 16L. Then, the original cover 3 is supported so as to be opened and closed in the directions indicated by the arrows C1, C2 with respect to the original stand 10 of the image reading portion 2 by these hinges 16R, 16L.

To the hinge movable bodies 14R, 14L, the pins 15R, 15L are fixed, respectively. Between the hinge movable bodies 14R and 14L, drive motors (opening and closing drive portions) 17R, 17L are arranged. Furthermore, rotary shafts 18R, 18L of the motors 17R, 17L are connected with the pins 15R, 15L through a speed reduction mechanism (not illustrated) having gears.

Figure 3:
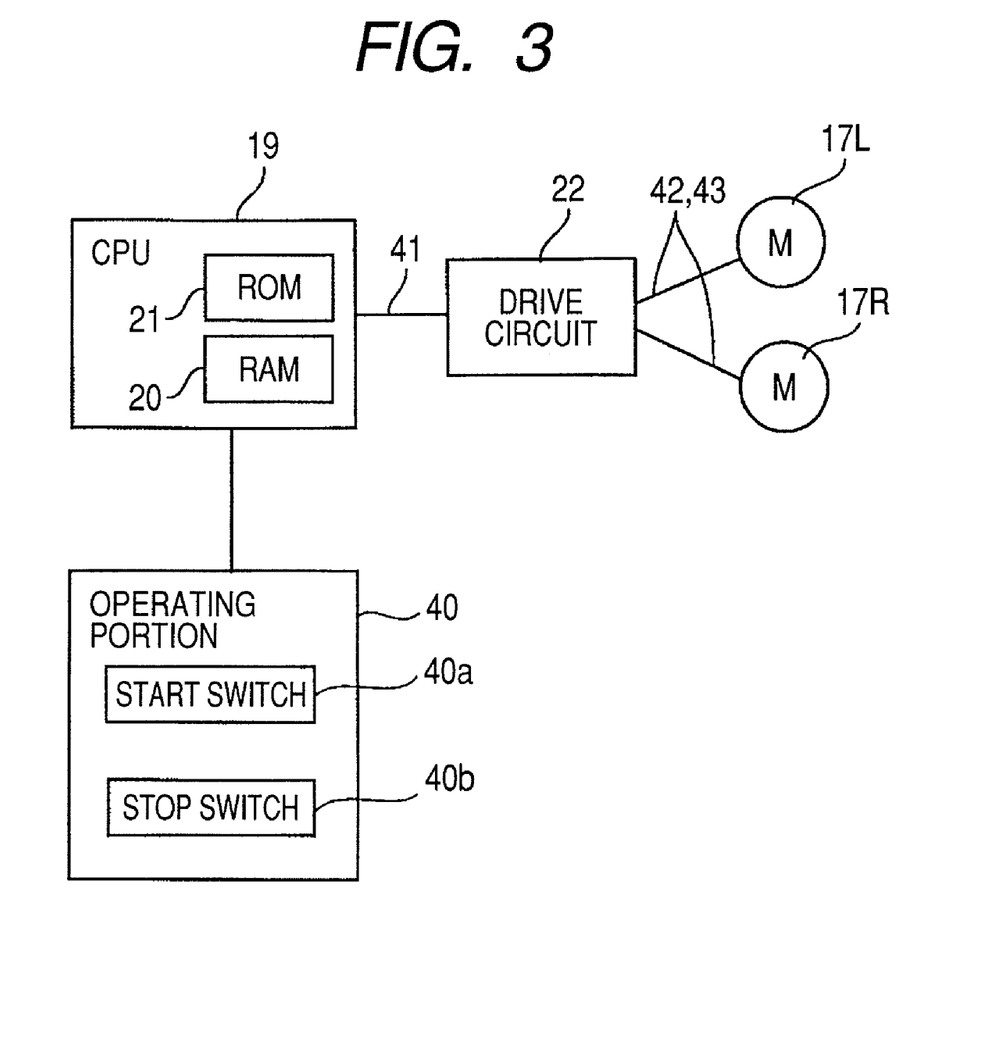
FIG. 3 is a block diagram relating to a drive control of drive motors.

Here, the drive motors 17R, 17L are driven and controlled with a construction shown in FIG. 3.

A CPU 19 shown in FIG. 3 is mounted in a control board (not illustrated) in the image reading apparatus 1, and performs various operation processes or control processes related to mainly image reading. To this CPU 19, a RAM 20 and a ROM 21 are connected. To the RAM 20, various data or programs related to the present image reading apparatus 1 are timely loaded, and then the programs are processed. In the ROM 21, various data or the programs related to the present image reading apparatus 1 are stored in advance, and, for example, referred to by a program processing or the like using the RAM 20.

Furthermore, in the ROM 21, individual drive profiles (acceleration and deceleration profiles Prl, Prr to be described later) for sequentially driving to control the drive motors 17R, 17L in drive control, respectively, are stored. These drive profiles are read out when the original cover 3 is processed in opening and closing drive processes by the CPU 19.

The CPU 19 outputs a motor drive signal 41 to a drive circuit 22 based on each read drive profile. Then, a phase excitation signal 42 and a motor current control signal 43 drive to control the drive motors 17R, 17L so that the motors may conform to each drive profile.

Moreover, an operating portion 40 is connected with the CPU 19, and in this operating portion 40, a start switch 40a with which an operator performs an open/close operation of the original cover 3, and a stop switch 40b allowing a stop operation are arranged. The CPU 19 drives opening and closing of the original cover 3 by a driving control of start/stop of the drive motors 17R, 17L with pressing of these switches as a trigger.

In addition, although the CPU 19 was described to be mounted on the control board (not illustrated) in the image reading apparatus 1, the CPU 19 may be mounted on a control board provided in an image forming apparatus integrally formed with the image reading apparatus 1. Moreover, the CPU may be one provided in an information device such as a personal computer separately provided, and the CPU performing the control processing of the image reading apparatus 1 is not necessarily provided in the image reading apparatus 1 itself. In this way, when the CPU is provided in the separate information device, signals are transmitted and received through a communication line (regardless of cable or radio), and various control processes are performed. In addition, the above-mentioned aspect can be available to the other RAMs, ROMs, and operating portions as well as the CPU.

Next, an operation relating to the opening and closing drive of the original cover 3 is described.

When the start switch 40a in the operating portion 40 is pressed down while the original cover 3 is in a closed state pressed with respect to the original stand 10, the original cover 3 is started to be driven to be opened in the direction indicated by the arrow C1 (refer to FIG. 2) from the closed state. Unless the stop switch 40b is pressed down, the original cover 3 in this open driven state is driven by the drive motors 17R, 17L until the cover 3 comes to be in an opened state substantially perpendicular to the original stand 10 continuously. The operator places the original on the original stand 10 thus having been in the opened state.

Furthermore, when the start switch 40a in the operating portion 40 is pressed down while the original cover 3 is in the opened state with respect to the original stand 10, the original cover 3 is started to be driven to be closed in the direction indicated by the arrow C2 (refer to FIG. 2) from the opened state. Unless the stop switch 40b is pressed down, the original cover 3 in this closed driven state is driven by the drive motors 17R, 17L until the original cover 3 comes to be in a closed state in which the original cover 3 is in press contact with the original stand 10. The image reading portion 2 performs a process of reading the image of the original placed on the original stand 10 when the original cover 3 is in the closed state.

In addition, when the stop switch is pressed down while the original cover 3 is in either the above-mentioned open driven state or closed driven state, the CPU 19 stops driving the drive motors 17R, 17L, and the original cover 3 is in a temporary stop state keeping a posture of the original cover 3 at that time. Here, in order to make the original cover 3 recover the open driven state or the closed driven state, the operator presses the start switch 40a down again.

Figure 4:
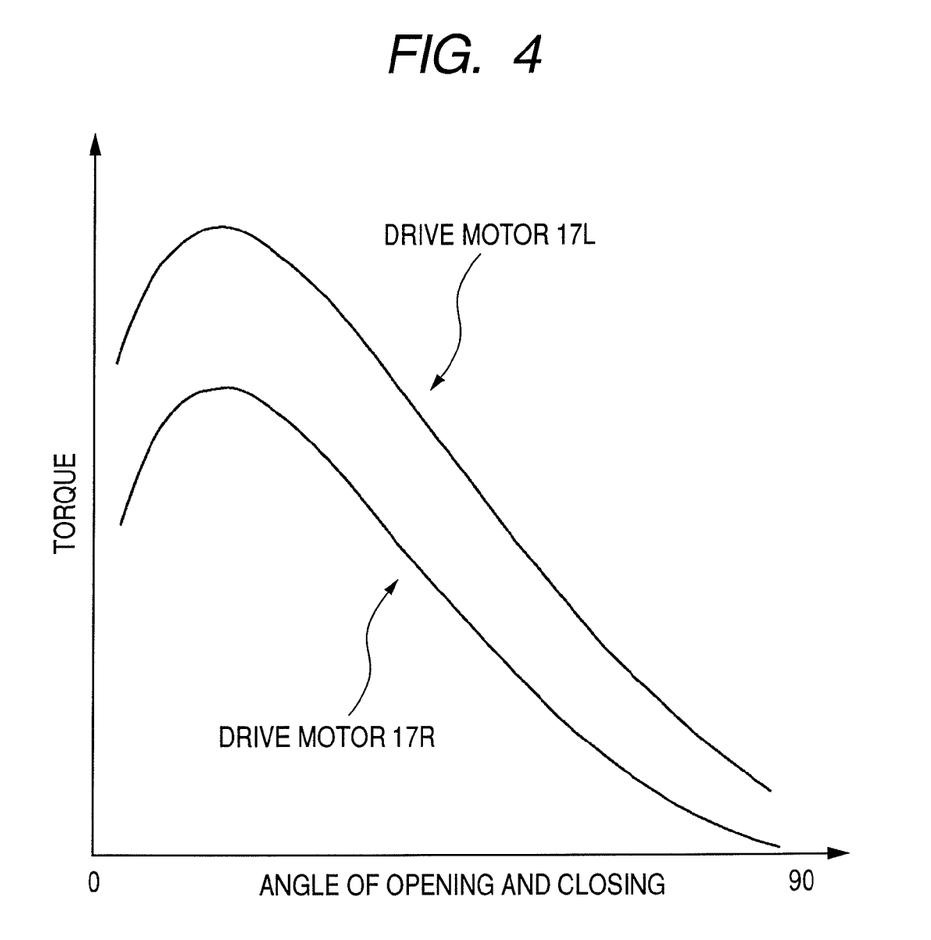
FIG. 4 is a diagram illustrating change in torque of each drive motor with respect to an angle of opening and closing of an original cover.

Then, a relation between an open/close angle of the original cover 3 and torques of the drive motors 17R, 17L is described by referring to FIG. 4. FIG. 4 is a diagram illustrating each torque change of the drive motors 17R, 17L with respect to the open/close angle of the original cover 3.

That is, in a state in which the original cover 3 is made to start to be open driven in the direction indicated by the arrow C1 (refer to FIG. 2) from a state in which the cover is closed in pressure contact with respect to the original stand 10, a torque generated by a weight of the original cover 3 acts relatively great with respect to each of the motors 17R, 17L. This requires both of the drive motors 17R, 17L to output the maximum torque as illustrated near an open/close angle of zero degree in FIG. 4.

Then, an action of the torque generated by a gravitational force of the original cover 3 decreases as the open/close angle of the original cover 3 increases in the direction indicated by the arrow C1, and then a torque output required decreases according to it.

Finally, when the original cover 3 stands substantially perpendicularly to the image reading portion 2, the torque generated by the gravitational force of the original cover 3 almost ceases to exist. Accordingly, a torque that shall be output by the drive motors 17R, 17L becomes almost unnecessary as illustrated near an open/close angle of 90 degrees in FIG. 4.

On the other hand, as illustrated in FIG. 1, since a region M and a region N of the original cover 3 are different in weight with respect to each other, loads applied to the drive motors 17R, 17L open-driving and close-driving at each position are different from each other. Here, a difference between torques generated by the drive motors 17R, 17L is derived in a way below in a relation to the above-mentioned load (weight).

(calculation formula of torque)

$$T = I\omega \quad (1)$$

T: Torque
I: Inertia moment
$\omega$: Angular acceleration
where, inertia moment I is $$I = GD^2/4g \quad (2)$$

G: Weight
D: Rotation diameter
g: Gravitational acceleration
Therefore, from formulas (1), (2)

$$\omega = 4gT/GD^2$$

Then, the drive motors 17R, 17L are set equal in angular acceleration $$4g(T17R)/(G16R)D^2 = 4g(T17L)/(G16L)D^2 \quad (3)$$

T17R: Torque of drive motor 17R
T17L: Torque of drive motor 17L
G16R: Weight applied to hinge 16R
G16L: Weight applied to hinge 16L In this way, since a torque ratio between both motors is proportional to a ratio of weights applied to respective hinges, respective torques of the drive motors 17R, 17L have only to be set based on these weights. Accordingly, a torque difference between the drive motors 17R, 17L as illustrated in FIG. 4 is determined based on the above-mentioned formula (3).

Figure 5:
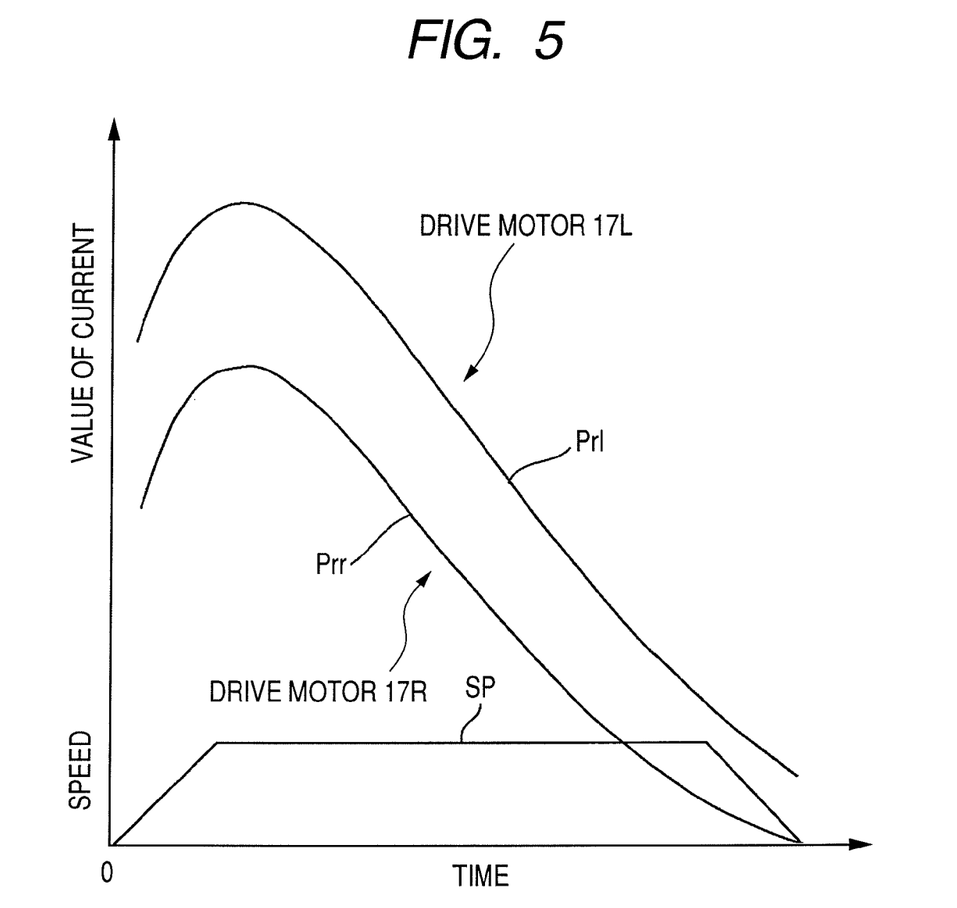
FIG. 5 is a graph showing change in an opening and closing speed with time of the original cover and a drive profile of each drive motor.

Next, a drive profile relating to drive controls of the drive motors 17L, 17R is described by referring to FIG. 5. FIG. 5 is a graph illustrating an open/close speed change with time of the original cover 3 and each drive profile of the drive motors 17L, 17R.

At a lower portion of the graph in FIG. 5, an ideal value SP (that is, a state in which the original cover 3 is driven to be open and closed without making the drive motors 17R, 17L influenced from each other), which is set by converting angular change into the aging change, of the open/close speeds of the original cover 3 is illustrated. Respective drive profiles (acceleration and deceleration profiles Prl, Prr) assigned to the drive motors 17L, 17R are determined based on this ideal value SP.

The drive motor 17L, since the motor opens and closes the region M relatively heavy in the original cover 3, requires high torque output in all ranges as shown in FIG. 4 when open-driving and close-driving. Therefore, in order that the drive motor 17L may obtain the open/close speeds indicated by the ideal value SP while outputting the high torque, a current profile like the acceleration and deceleration profile Prl is required to be determined.

Furthermore, the drive motor 17R, since the motor opens and closes the region N relatively light in the original cover 3, requires low torque output in all ranges as shown in FIG. 4 when open-driving and close-driving. Therefore, in order that the drive motor 17R may obtain the open/close speeds illustrated by the ideal value SP while outputting the low torque, a current profile like the acceleration and deceleration profile Prr is required to be determined.

In an embodiment of the present invention described above, as a drive profile relating to a value of current depending on each load change applied to the drive motors 17L, 17R, individual drive profiles such as the acceleration and deceleration profiles Prl, Prr are set and assigned. This allows the CPU 19 to drive the drive motors 17L, 17R based on a sequence of each current value based on the acceleration and deceleration profiles Prl, Prr. As a result of it, the drive motors 17L, 17R are made to produce no unnecessary stress such as twist or the like with respect to the original cover 3, therefore, a stress applied when open-driving and close-driving the original cover 3 is adjusted in all ranges. Accordingly, the original cover 3 driven by a plurality of opening and closing drive mechanisms such as the drive motors 17L, 17R is driven to be opened and closed with a stable action without generating yawing.

Incidentally, although, in the present embodiment, it was described that the drive profiles were set and stored in advance in the ROM 21, the drive profile may not be necessarily stored in advance. For example, the CPU 19 detects a load at each drive location with a load cell or the like in an initial stage of open-driving and close-driving of the original cover 3, and leads an estimated value of a flow (sequence) of the load required in entire opening and closing drive from the load detected at this initial stage. Then, the CPU 19 may determine an applied current value, by which the open/close speeds of entire drive locations become uniform, to each drive motor as a drive profile. This example makes it possible to stably drive opening and closing of the original cover 3 even when a load distribution of the original cover 3 has a possibility to be varied in such a condition of a work with a sheet S left placed on the sheet feeding tray 4.

Furthermore, it was described that the open-driving and close-driving in the image reading apparatus 1 are controlled by the start switch 40a and the stop switch 40b in the operating portion 40. However, it is needless to say that the drive of opening and closing may be started by the pressing of a switch (for example, copy starting button) relating to a start of reading the original as a trigger. This allows prevention of a wrong operation such that the original cover is left unclosed by mistake when starting to read the original. Furthermore, in the case that the present image reading apparatus 1 is integrally formed with an image forming apparatus or the like, the opening and closing may be driven with the pressing of a switch included in this image forming apparatus as a trigger. That is, its aspect is not limited by the example described in the present embodiment.

As mentioned above, the image reading apparatus according to the present embodiment is useful when stably open-driving and close-driving the original cover, in particular, suitable for the image reading apparatus including the original cover driven to be opened and closed by a plurality of opening and closing drive mechanisms.

According to the present invention, a plurality of opening and closing drive mechanisms for open-driving and close-driving the original cover are driven on the basis of respective drive profiles set in advance, and thus the original cover is stably driven to be opened and closed by a plurality of opening and closing drive mechanisms.

While the present invention has been described with reference to exemplary embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2006-261247 filed on Sep. 26, 2006, which is hereby incorporated by reference herein in its entirety.

What is claimed is:

1. An image reading apparatus comprising:
an image reading portion configured to read an image of an original placed on an original stand;
an original cover pressing the original on the original stand;
a plurality of hinges pivotally supporting the original cover on the image reading portion;
a plurality of drive portions configured to drive the plurality of hinges, respectively, to open and close the original cover; and
a control portion configured to control the plurality of drive portions based on drive profiles respectively corresponding to the plurality of drive portions,
wherein each of the drive profiles relates to a value of current depending on a load change applied to each of the plurality of drive portions while the original cover is opened up or closed down.

2. An image reading apparatus according to claim 1, wherein the plurality of drive portions drive the plurality of hinges at a same speed.

3. An image reading apparatus according to claim 1, wherein the original cover includes:
a sheet feeding tray;
an original conveying unit conveying the original placed on the sheet feeding tray;
a tray receiving the original discharged from the original conveying unit; and
an original pressing portion pressing the original on the original stand.

4. An image reading apparatus according to claim 3, wherein the original conveying unit is disposed nearer one hinge of the plurality of hinges.

5. An image reading apparatus according to claim 4, wherein a torque in the drive portion driving the one hinge of the plurality of hinges nearer the original conveying unit is higher than a torque in the drive portion driving the another hinge.

6. An image reading apparatus according to claim 3, wherein the plurality of hinges includes a first hinge and a second hinge, the plurality of drive portions includes a first drive portion driving the first hinge and a second drive portion driving the second hinge, the original conveying unit is disposed nearer the first hinge of the plurality of hinges, and a torque in the first drive portion driving the first hinge nearer the original conveying unit is higher than a torque in the second drive portion driving the second hinge.

7. An image reading apparatus according to claim 1, further comprising an operating portion providing a command to the control portion to control a drive start and a drive stop of the plurality of drive portions.

8. An image reading apparatus according to claim 1, wherein the control portion detects loads of the plurality of drive portions in opening and closing the original cover, and determines the drive profiles based on a detected result.

* * * * *